(12) United States Patent
Henrique Minatel et al.

(10) Patent No.: US 10,506,642 B2
(45) Date of Patent: Dec. 10, 2019

(54) METHOD FOR VERIFYING AUTHENTICITY, CONFIGURING NETWORK CREDENTIALS AND CRYPTOGRAPHIC KEYS FOR INTERNET OF THINGS (IOT) DEVICES USING NEAR FIELD COMMUNICATION (NFC)

(71) Applicant: SAMSUNG ELETRÔNICA DA AMAZÔNIA LTDA., Campinas (BR)

(72) Inventors: Pedro Henrique Minatel, Campinas (BR); Sang Hyuk Lee, Campinas (BR); Breno Silva Pinto, Campinas (BR); Felipe Caye Batalha Boeira, Campinas (BR)

(73) Assignee: SAMSUNG ELETRÔNICA DA AMAZÔNIA LTDA., Campinas, São Paulo (BR)

( * ) Notice: Subject to any disclaimer, the term of this patent is extended or adjusted under 35 U.S.C. 154(b) by 318 days.

(21) Appl. No.: 15/365,069

(22) Filed: Nov. 30, 2016

(65) Prior Publication Data
US 2018/0152443 A1    May 31, 2018

(51) Int. Cl.
*H04W 76/10*    (2018.01)
*H04L 29/08*    (2006.01)
*H04B 5/00*    (2006.01)
*H04W 12/06*    (2009.01)
*H04W 12/04*    (2009.01)
*H04W 8/24*    (2009.01)

(52) U.S. Cl.
CPC .......... *H04W 76/10* (2018.02); *H04B 5/0056* (2013.01); *H04L 67/10* (2013.01); *H04W 12/04* (2013.01); *H04W 12/06* (2013.01); *H04W 8/24* (2013.01)

(58) Field of Classification Search
CPC ............ H04L 63/0853; H04L 63/0876; H04L 9/0877; H04L 67/10; H04L 2209/24; H04W 12/04; H04W 12/06; H04W 8/24; H04W 76/02; H04B 5/0056; G06F 21/31
See application file for complete search history.

(56) References Cited

U.S. PATENT DOCUMENTS

| | | | | |
|---|---|---|---|---|
| 9,760,697 | B1* | 9/2017 | Walker | ................ G06F 21/31 |
| 2004/0059915 | A1* | 3/2004 | Laniepce | ........... G07C 9/00087 |
| | | | | 713/169 |
| 2009/0227282 | A1* | 9/2009 | Miyabayashi | ...... H04L 63/0492 |
| | | | | 455/552.1 |
| 2014/0122903 | A1* | 5/2014 | Endo | ..................... G06F 21/602 |
| | | | | 713/193 |
| 2016/0330182 | A1* | 11/2016 | Jeon | ....................... H04L 63/062 |

\* cited by examiner

*Primary Examiner* — Mohammed Waliullah

(57) ABSTRACT

A method to securely send, to the device the cryptographic key and the local wireless network credentials with an authenticity verification to ensure that the device is safe to be added to the local network. Those credentials are sent using a NFC enabled device to the internal EEPROM with NFC interface embedded on the target connected device. The method enforces the configuration setup process to avoid critical vulnerabilities in IoT devices, minimizing security and privacy issues to the final user and avoid any unauthorized device to be added to the network. When a new IoT device is added, assuming that this new device has no security key embedded and no stored authentication credentials, a secure mobile application will send that information to the device using NFC. This application has an interface to configure the device in a single step.

12 Claims, 6 Drawing Sheets

METHOD FOR VERIFYING AUTHENTICITY, CONFIGURING NETWORK CREDENTIALS AND CRYPTOGRAPHIC KEYS FOR INTERNET OF THINGS (IOT) DEVICES USING NEAR FIELD COMMUNICATION (NFC)

TECHNICAL FIELD

The present invention relates to a method to send the cryptographic key and the local wireless network credentials and also authenticity verification to a device, in a secure way, ensure that the device is safe to be added to the local network.

BACKGROUND OF INVENTION

The connected devices, also known as Internet of Things (IoT) devices, are expected to reach approximately 50 billion of devices connected until 2020, according to reports from Gartner (available at http://www.gartner.com/newsroom/id/3165317) and Cisco (available at http://www.cisco.com/c/en/us/solutions/internet-of-things/overview.html?). This huge number of connected devices will potentially increase the network attacks and put user's privacy at risk.

The security risks associated with connected devices may vary from just obtaining data about the user's devices, such as user's home temperature, without the user concent (best or "minimal risk" scenario) to obtain sensitive information about user's life and habits to be used against him/her (worst or "maximum risk" scenario).

Another critical scenario are devices that control other things (objects, devices), like thermostats, lights, door locks, garage doors, pet feeders, alarm systems or any other actuator that could be remotely controlled by the attacker. That could be used to damage user's things or even to get easy access to user's home.

According to the OWASP (Open Web Application Security Project) published in the IoT Security Project (available online at https://www.owasp.org/index.php/OWASP_Internet_of_Things_Project), the top 10 security vulnerabilities in Internet of Things devices that have been found in 2014. In the list, we can found some critical issues such like Insufficient Authentication/Authorization, Lack of Transport Encryption, Insufficient Security Configurability and Poor Physical Security.

Therefore, it is clear that there is a need to prevent, minimize or avoid these security vulnerabilities. Solutions with strong security features enable the users to protect themselves against attacks and ensure that data is not being analyzed or controlled by others, without a previous authorization. This will be a strong key feature to the raising IoT market and could enable the sales based on how strong the security is on the connected devices.

Additionally, there is an important aspect to be considered: the "trade-off" between security and usability. As some studies indicate (for example, please see document "Security and Usability: Analysis and Evaluation" available online at http://citeseerx.ist.psu.edu/viewdoc/download?doi=10.1.1.16 2.374&rep=rep1&type=pdf), usability and security are not mutually inclusive concepts. Most times, the easier a system is to use, the less secure it might be. For illustrational purposes, take as example the authentication task: Please imagine that there is no authentication procedure (log in) for a user to check his/her email (or authenticate to any system). It would be extremely easy for the user (i.e., a high degree of usability), but it would be extremely unsafe (little or no degree of security). On the other hand, imagine that in order to access his/her email (or authenticate to any system) the user has to type in a password, decipher a visually encrypted code and then type in a one-time password (OTP) sent by SMS to his/her smartphone. It would provide a very safe authentication system (i.e., high degree of security), but it would be very difficult to use such a system (low degree of usability).

Therefore, there is a need to provide secure and easy-to-use solutions for IoT market. This is one of the main objects of the present invention.

This method of the present invention is well aligned to become an international standard due the Internet of Things huge market opportunities and the investments on developing technologies and services. This invention will add a great value to the IoT solutions in a short time to market.

In the current state of art, we have found solutions that use the concept of enabling the connected device, as a Wi-Fi hotspot, using the 802.11x standard in order to a smart phone or any other device or computer with Wi-Fi capabilities to connect it directly to the device and by an embedded web page or an application installed, be able to configure the device with the router credentials and many other configuration variations.

Additionally, some technologies use a specific router with a preconfigured authentication credentials and security keys, in order to connect devices directly into the network or to be visible for discovering and broadcasting process for new devices into the network. This router is also connected by wired connection to the internet router. This specific router does not connect to the internet directly, and then you have to use two routers in the network.

The main problem in broadcast discovering is that the device will be using energy and processing until the pairing process is done/completed. It means that if the user does not configure the device, this broadcast will consume an amount of energy without any benefit for the user.

In the security aspect, some of the current technologies use factory security keys (default, standard, preconfigured) and passwords, which are used for all the devices and add a security risk/vulnerability, when the user keeps the factory settings or in some cases the device does not provides the ability to change the key or passwords.

In this scenario, it is necessary a solution that can be easily used to configure in a secure environment all the credentials and keys, without using factory settings, and that allows each user to have a specific security key.

Intel has published a presentation on Jun. 3, 2016 [Intel: https://www.youtube.com/watch?v=pQwh-rRKDg0] that shows a process using NFC passive tags/stickers and NFC adapters to provide provisioning information about the connected device to a provisioning device in order to transmit this provisioning information to the cloud service though the provisioning device. In this case, the connected device does not receive any information from the provisioning device and it seems to be read only.

In addition, a second method is presented using a NFC adapter embedded on the device that reads the information from the provisioning device. In this case, the provisioning device acts as a NFC tag to provide the provisioning information to the device and the device must be turned on, since the NFC adapter does not harvest the power from the provisioning device.

The Intel presentation is based on methods and protocols for provisioning the device by using a NFC tag or adapter to provide information to the cloud, and the configuration is unchangeable. Anyone with a NFC reader could read this information.

In terms of usability, the present method using NFC tags needs two NFC tapping steps to conclude the configuration, when using the router NFC, or only one when using the router NFC on board tool or using the NFC adapter embedded on device.

The table below shows the differences between the present method by Intel and the present invention:

| Feature | Diference |
|---|---|
| Is NFC tag read and write protected? | The Intel solution does not mention if the tag is protected. The present solution must verify the device authenticity before writing on NFC. |
| Can device be configured even if device is turned off? | The Intel solution must be turned on. The present solution can be configured even if it is turned off. |
| Is device radio transceiver off before configured? | Intel solution the radio is always on. The present solution only powers on the radio after the configuration. |
| Is the configuration protected from NFC tag reading? | The Intel solution provides the keys and configuration on the NFC tag. The present solution receives the keys and credentials from the configuration device. |
| Is the configuration encrypted? | The Intel solution does not mention if the configuration is encrypted on the NFC tag. Our solution encrypts the configuration on the internal memory. |
| Could the configuration be done offline? | The Intel solution uses a cloud based service to do the configuration processing. The present solution also uses the cloud to validate the device, but this could be done offline, if at least one successful login on the cloud service. |
| Does the method resist to eavesdropping attack during configuration? | Both solutions can resist to an eavesdropping attack. |
| Does the method verify the device authenticity? | The Intel solution mentions about the device ownership but it does not verify the device authenticity. The present solution implements this verification before sending the configuration. |

*the configuration device application needs at least one valid login to get the credentials from the cloud.

Intel method uses the Web NFC (https://w3c.github.io/web-nfc/) specification, not standard, for the messaging layer exchange. On other hand, the method proposed by the present invention does not cover or specify the protocol layer for messaging and it is transparent to use any messaging protocol, public or private.

The Microsoft provisioning at the startup uses a XML file that is used during the startup process only once or after a complete device wipe up. Such method uses a SD card with the provisioning file and it is manually added to the memory root directory.

Chinese Patent document CN103916297A, published on Jul. 9, 2014, entitled: "Internet of things household appliance, system, wireless intelligent terminal and data transmission and configuration method", describes a method to configure home appliances using two NFC apparatus to list the networks available to which appliances could be connected. The Chinese Patent document CN103916297A does not cover some security aspects, which are key features in the present invention, such as configuring the cryptographic credentials and keeping the wireless radio off, until a successful configuration. Such Chinese document also does not cover the methods to verify the device authenticity and the ownership.

U.S. Pat. No. 7,970,350B2, published on Jun. 28, 2011, entitled: "Devices and methods for content sharing", describes a method to share content between two or more devices using NFC, including the Wi-Fi credentials. As the first cited Chinese document, this patent also does not cover some security aspects that are key features in the presented invention, including the wireless radio control, device authenticity verification and device ownership. The U.S. Pat. No. 7,970,350B2 also does not disclose how the sensitive data is stored in the device after the transmission over NFC (which could still be an attack vector that could reduce the security of the solution).

International application WO2015089318, published on Jun. 18, 2015, entitled: "Secure Communication Channel", describes a method for a secure channel between two devices that grants an association between the devices and the users, for each device. The method describes the first communication form the device to the server over 7a secure channel and then a second communication from the server with the cryptographic key associated with that specific device. According to said international application, the device needs to connect to the server in order to exchange the cryptographic key, this scenario does not cover any other configuration, such as the Wi-Fi or cloud service credentials.

SUMMARY OF THE INVENTION

As above-mentioned, the present invention relates to a method to send to the device, in a secure manner, the cryptographic key and the local wireless network credentials with an authenticity verification to ensure that the device is safe to be added to the local network. Those credentials are sent using a NFC enabled device, such as a smart phone or a tablet, to the internal Electrically-Erasable Programmable Read-Only Memory (EEPROM) with NFC interface (ISO/IEC 18092) embedded on the target connected device.

The present invention will enforce the configuration setup process to avoid some of the minimizing security and privacy issues to the final user and avoid any unauthorized device to be added to the network and compromising the security and privacy.

When the user needs to add a new IoT device to the network, assuming that this new device has no security key embedded and no authentication credentials stored in its internal memory, the user will use a secure mobile application to send that information to the device over the NFC. This application consists of an intuitive interface to easily configure the device in a single step.

After the devices configuration, sent over NFC, the information will be available on the embedded EEPROM to the configured device read it in the next initialization using an internal communication channel to the EEPROM (i.e. Inter-Integrated Circuit or $I^2C$). Once the connected device read the stored information in the EEPROM, that information will be moved to another embedded memory in order to prevent any attempt to read using NFC.

Once the security key and the authentication credentials are configured, the device will power up the radio transceiver (e.g.: Wi-Fi, ZigBee, Bluetooth . . . ) in order to start the communication with the cloud based service, using the configured credentials. When the radio transceiver is off until the configuration is completed, the device is protected against overtaking attacks before the initial configuration (and additionally, it saves some battery/energy). Some users just turn on the devices and then leave it without configuration.

The configured security key will be used for the cryptography mechanism and the authentication credentials to connect to the network and then to the cloud based solution. If the user needs to reconfigure or change the security key or authentication credentials, the process will be similar to the new device operation.

Use of factory passwords (default, standard, predefined) or security keys is a common behavior when installing a new IoT device, because it is an easier way (plug and play), but it is a critical vulnerability and an attack vector (it would be easy to an attacker to find/stole this information and misuse it as used by the Mirai attack (https://techcrunch.com/2016/10/25/the-mirai-botnets-internet-takedown-opens-up-a-new-market-for-attackers-and-defenders/)). In this sense, the present invention goes beyond the prior art solutions and adds value to the existing IoT solutions (e.g. SmartThings, Google Nest, Philips Hue, WeMo . . . ) by providing a secure, but easy-to-use solution to configure an IoT device.

The scope of use of the present invention is very large, since it is possible to apply the present method on multiple types of IoT devices, sensors, smart appliances, etc. It would be easier to detect any infringements by offending solutions (very difficult to design around) by observing the method that the users are enabling and configuring the IoT devices, more specifically if a new IoT device is added to the network by receiving the initial configuration/settings (security keys and network credentials) by short range communication (via NFC, e.g. tapping/approximating a mobile device with the proposed application to the new IoT device).

Finally, we consider there is a high probability of use by all companies, because the present invention provides a very simple, intuitive and more secure way to configure connected devices, being more secure against some attacks and helps keeping the security and privacy on the connected devices. Considering that the implementation of the present method will offer an easy-to-use way to configure the connected devices, it could become a standard/pattern to the whole Internet of Things industry.

The present invention brings to the market a new method for secure configuration that prevents attacks and eliminates some well-known vulnerabilities and weakness in connected devices. This method allows the user to setup, in a secure environment, the keys and credentials for each connected device in their network in a single step by using NFC technology to send the information from the configuration device to the connected device.

The method of the present invention also adds the functionality to configure the device before powering it on, by using the NFC technology that is activated by the magnetic field generated by the configuration device. This means that the user can configure the connected device before installing it; for example, the user can configure a smart light switch before attaching it on the wall, making the process easier to be replicated for other devices.

The present method also increases the deployment speed of any connected device, not limited to Internet of Things devices and residential use.

Advantages of the Invention

Based on the aforementioned inconveniences of the mentioned prior art solutions, we can enumerate the following advantages of the present invention:

The present invention simplifies the configuration process for any Internet of Things device, using NFC technology for the initial configuration. The present invention eliminates the need of a discovering process or any other broadcasting functionality in order to identify any new device in the network.

The present invention also provides the ability to easily configure and update the security credentials by using NFC technology in a secure manner.

The present invention also adds a security feature to the connected device in order to configure the new device with the security/cryptography key on the first configuration, using a new key for each user, avoiding pre-defined or default keys. This method also aims to avoid replication attacks and key leakage.

The present invention defines that the radio transceiver will be only powered on after the full configuration is concluded, in order to prevent man-in-the-middle attacks or sniffing the communication during the configuration process.

If the device is not configured properly, the radio transceiver will stay disabled without any communication feature, until its final configuration. In this case, only the NFC will be enabled as data transceiver.

The present invention also eliminates the need of a web interface to configure the device by turning the device into a hotspot.

The present invention also prevents reverse engineering on the code to retrieve the security keys, since the new device does not have a key until the first configuration is completed.

The present invention checks the device authenticity to avoid fake devices or tag emulation attacks. The present invention also allows the user to replicate the configuration across multiple devices in order to configure all devices in the same easily way using the mobile device.

Disadvantages of the Invention

A main limitation of the present method relies on the fact that the user can only configure the connected device, using the NFC technology. Therefore, the user must have a device, such as a smartphone, a tablet, a notebook or a router) with NFC capabilities in order to properly configure the connected device.

BRIEF DESCRIPTION OF THE DRAWINGS

The objects and advantages of the present invention will become clearer from the following detailed description of a preferred, but non-limitative embodiment, and its accompanying figures, wherein.

DETAILED DESCRIPTION OF INVENTION

The following description is presented to enable a person skilled in the art to make and use the embodiments, and it is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features herein disclosed.

Figure 1A:
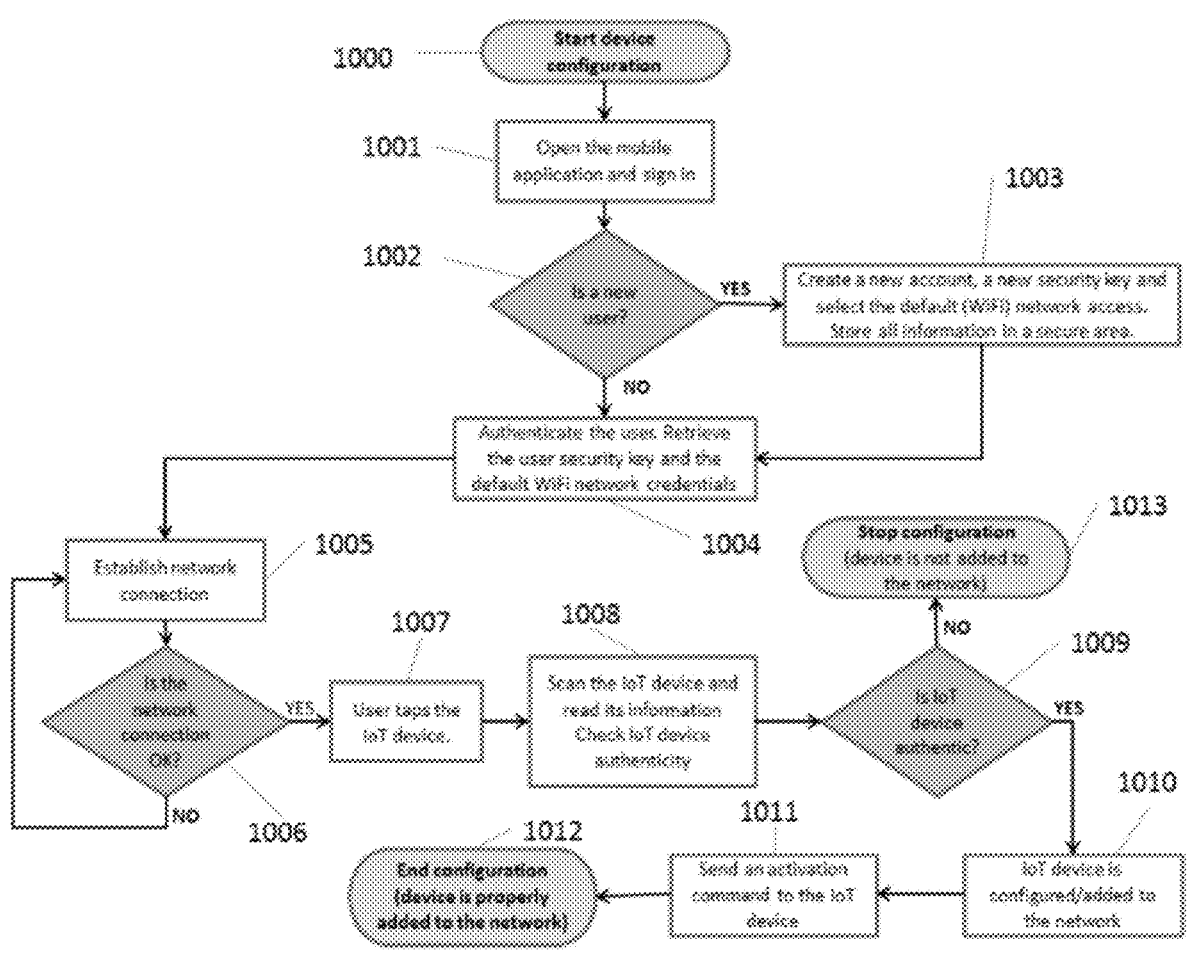
FIG. 1a is a flowchart of the present method to configure, in a secure and easy way, connected devices using NFC technology for sensitive data transmission.

FIG. 1a is the flowchart representing each step of the method disclosed in the present invention, from the whole configuration process "Secure method to enable and configure internet of things devices using near field communication".

Initially, in the FIG. 1a, the configuration method (1000) is started by a mobile application (1001). Once the mobile application started, the user need to authenticate into the cloud service; if the user is a new user (1002), then the user will create an account (providing profile information), select a default (Wi-Fi) network access and create a security key, that will be used for the cryptographic methods (1003). This initial configuration step is performed only once, unless the user changes the network or the cloud credentials (as it will be further detailed, the application provides a configuration panel to change it). In the next application initialization, the user can reuse the same information. All this data are stored in a secure area, protected from unauthorized access and both, network and cloud authentication are stored as hashes.

Once the sign-in is completed (or the new account created), the user security key and the default network credentials are retrieved (1004). Then, the present method continuously attempts to establish a connection with the network (1005, 1006).

After the retrieval of user's information (security key, default network credentials) and the successful network connection, the user is able to configure/add the new IoT device (to the network) by tapping his/her mobile device into the said IoT device (1007).

The mobile device NFC reader will detect the IoT device NFC EEPROM, and will read/scan (1008) the read-only memory region to capture the IoT device information, such as the serial number and model, etc. Then, the present method will validate the serial number (or unique ID information available) in order ensure that the device is authentic (1008, 1009). This authentication can be local or use a cloud database, supplied by the device manufacturer. The purposes for this authentication are to avoid tag emulation attack (when a NFC device emulates a device in order to intercept the data content), to prevent fake devices produced by non-authorized manufactures and to block, for any reason, a device to be added to the network.

The authenticity is verified by using the unique ID, stored in the device NFC that was collected by the smartphone (1007) and checked against the manufacturer database system. Once checked in the database, the system will inform whether that device is known.

If the device cannot be validated (1009), the configuration process will be terminated (1013), without adding the IoT device to the network.

When the authenticity check is successful (1008, 1009), the IoT device is configured/added as a new device into the network (1010).

The present method (via mobile application) will write all necessary information (security key, network credentials, etc.) into the IoT device's NFC tag memory using a password protected area. This password-protected area is used only for data transfer and this data will be erased after the IoT device successfully initialization and the password are stored in the mobile application.

The IoT device will read this area whenever initiated, in order to update the credentials in case of reconfiguration from the same defined owner.

Finally, the present method (via mobile application) will send an activation command (1011) to the IoT device, which is stored in a write protected memory area, which enables the radio hardware (Wi-Fi) of the IoT device. Please note that the device's radio (e.g. Wi-Fi) is off until the device is properly configured with the credentials (steps 1010, 1011). This is an important security feature of the present invention, since it avoids a common attack vector, if the device's radio is turned on before the configuration process, an attacker could access the device without authorization, using default passwords, for example, to attack the devices, making it a serious risk if the device is a security connected camera.

Once fully configured and activated, the IoT device is properly added to the network, and the present configuration method is completed (1012). This IoT device will only accept new configuration by NFC from devices with the same security credentials. If the user wants to change the device to another network or user, using other security key, he must revoke the device ownership before transferring to a new user or network using the original security key.

Figure 1B:
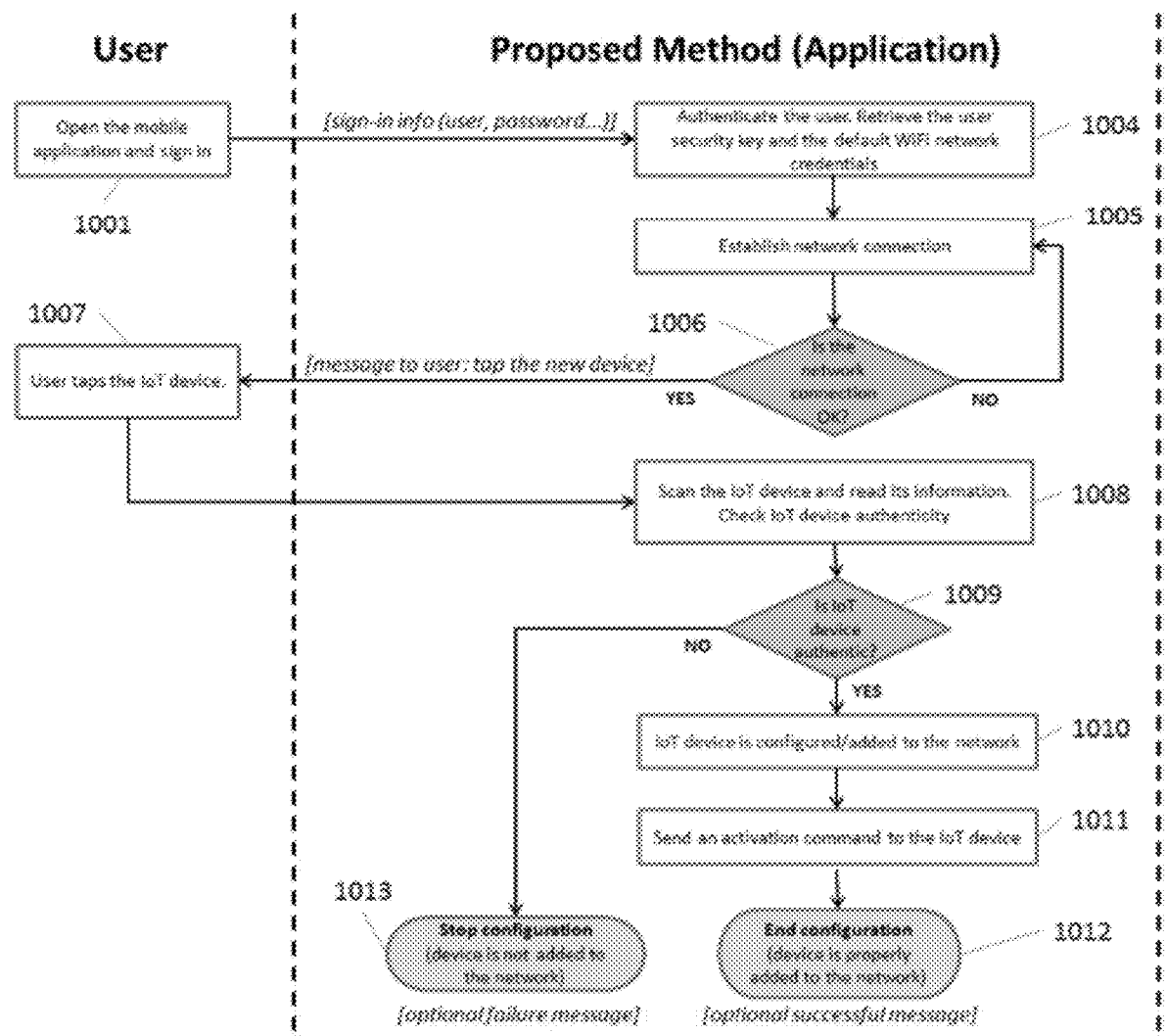
FIG. 1b is a complementary dataflow chart of the present method.

The method of the present invention (1000) improves the security and avoids unauthorized reconfiguration. Additionally, it is easy to use (user friendly) as most of the user's efforts are done in the first access (new user), when the user has to create a new account, a new security key and select the default/standard (Wi-Fi) network (step 1003). In the subsequent times, for regular/common use of the method (1000), the user only has to sign in to the mobile application (step 1001) and then tap the mobile into the new IoT device to be configured (step 1007); all other steps (1004-1006 and 1008-1013) are automatically executed by the present method (via mobile application), as illustrated on FIG. 1b.

Figure 2A:
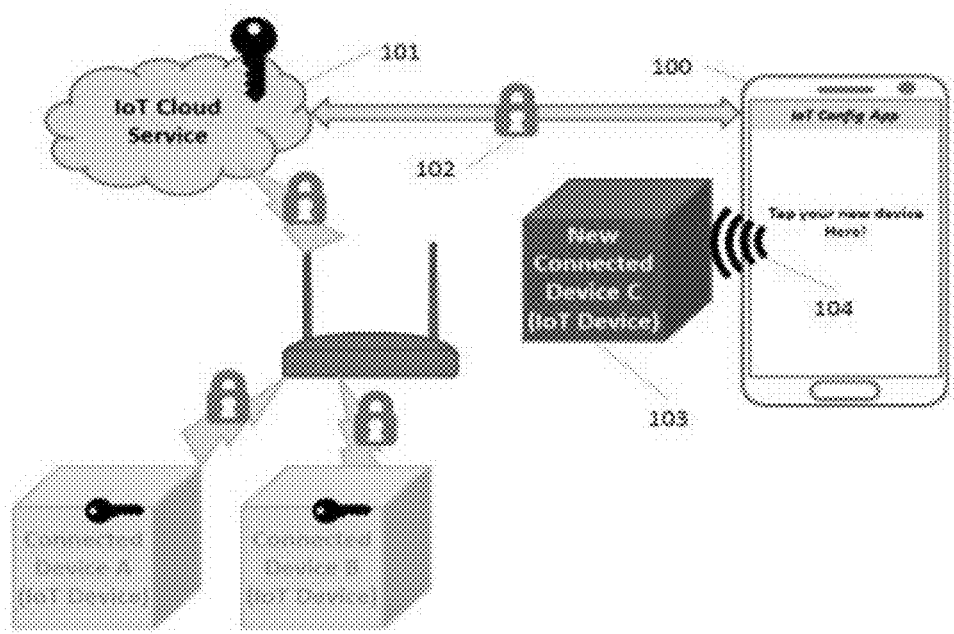
FIG. 2a is a scenario of the present method to configure a new connected device using a mobile phone with NFC technology.

FIG. 2a presents a preferred use of the present method (1000) to configure a new IoT device (103), using a mobile phone (100) with an application that implements the method (1000). After signing in at step 1001, the user security key and network credentials are retrieved at step 1004 and then connection is established with the network at steps 1005-1006, the user taps his/her mobile device (100) into the new IoT device (103), using NFC connection (104) at step 1007. The mobile application of the present method will check the new device (103) authenticity at steps 1008-1009 (locally in the mobile phone 100, or remotely in the cloud server 101). After confirming the new device (103) authenticity, the mobile application of the present method will communicate to the cloud server (101), using secure communication (such as SSL/TLS, properly configured to avoid main-in-middle attacks (102)), in order to retrieve and then write the security key into the new device (103) using NFC connection (104) at step 1010. Then, the mobile application of the present method will send an activation command to the new device (103) [step 1011], which enables the radio hardware (Wi-Fi) of the device (103) and make it finally available to the network at step 1012.

Figure 2B:
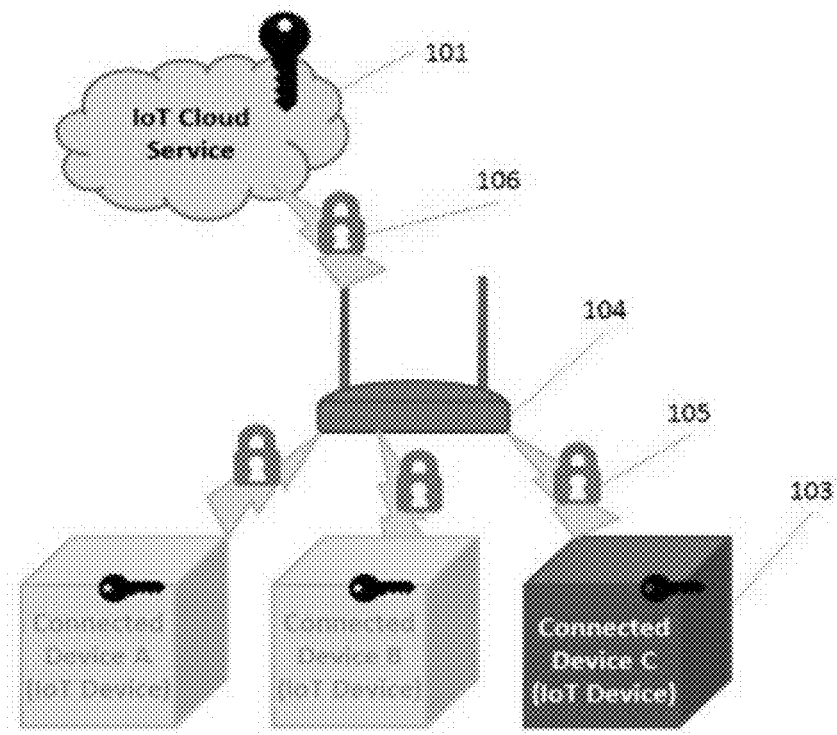
FIG. 2b presents the communication flow from the new device to the network and the cloud service.

After the device is added to the network, as shown in the FIG. 2b, the new device (103) will connect to the network router (104), using secure communication (105) protected by network credentials, and the router (104) will connect to the cloud service (101) using also a secure communication (106).

Figure 3:
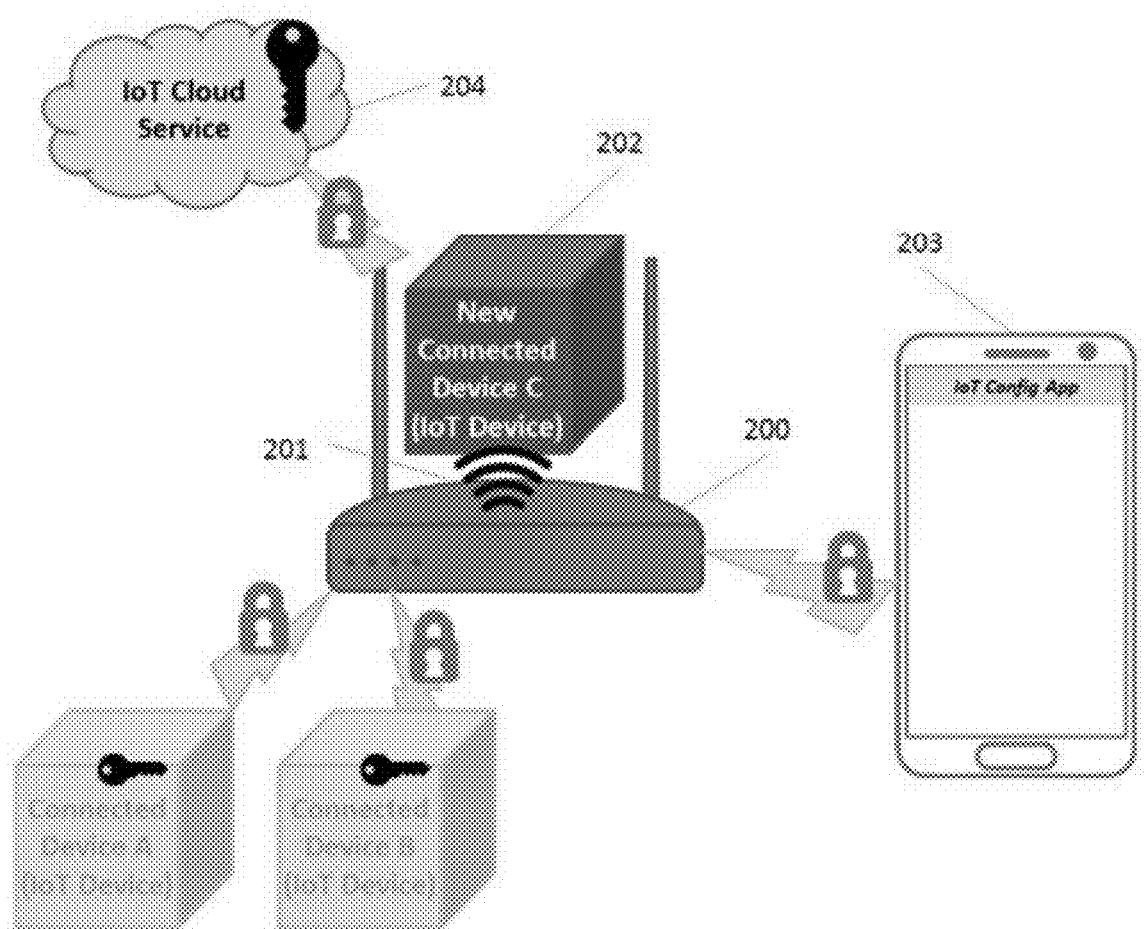
FIG. 3 is a scenario of the present method to configure a new connected device alternatively using a router with NFC adapter.

Another possible scenario to configure connected new device is presented in the FIG. 3, and it uses a network router (200) with NFC embedded (201), as an alternative or a complementary manner to configure/add a new device (202). In this alternative/complementary manner, the user may not use his/her mobile device (203) to configure the new device (202). Instead, the user can tap/approximate the new device (202) into the network router (200) via NFC connection (201). In this scenario, the cloud server (204) can remotely make the authenticity check. In this case, if authenticity is confirmed, the network router (202) have a NFC adapter to record/store the security key and network credentials into the new device (202), configuring it to be available on the network.

Figure 4:
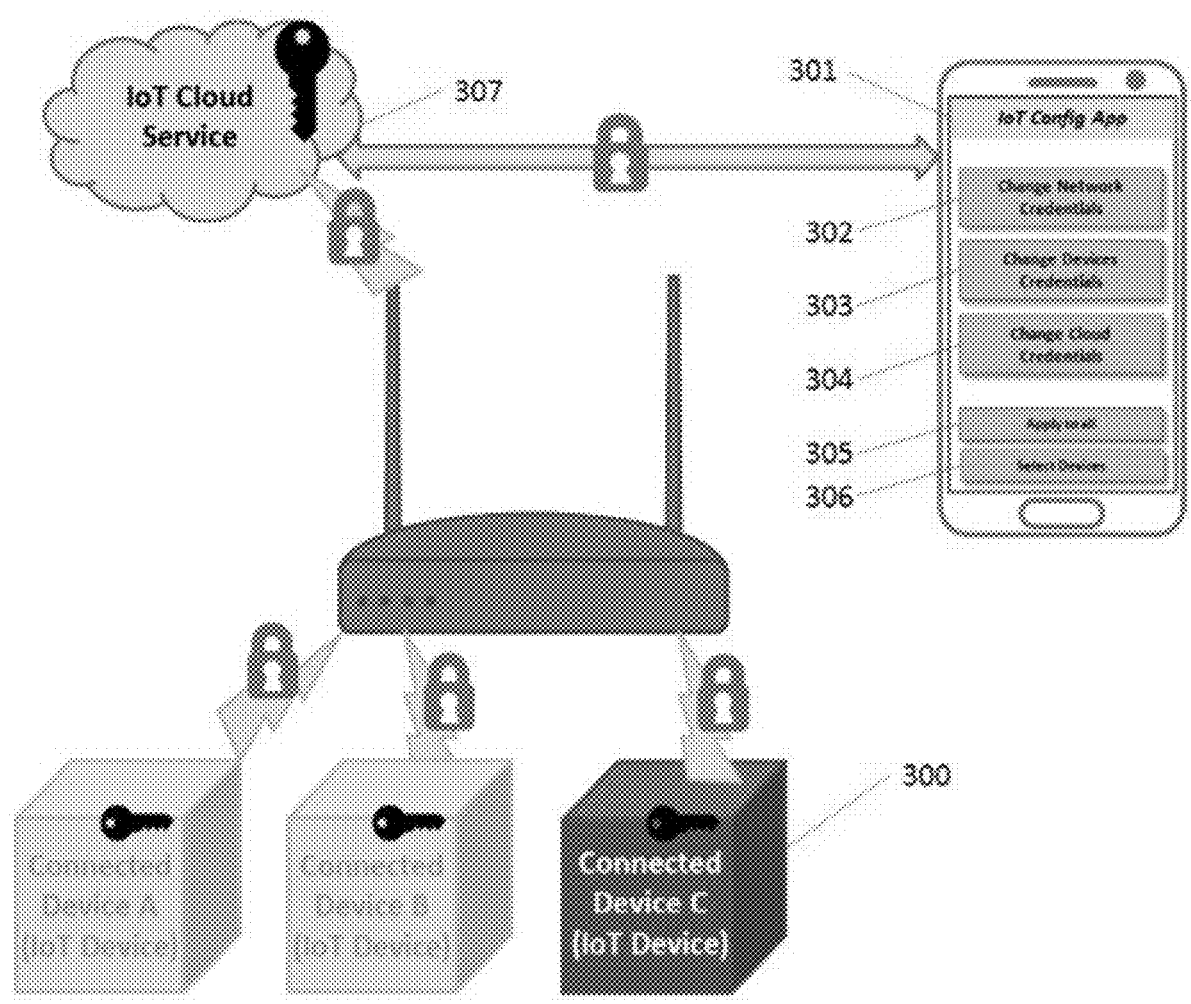
FIG. 4 is a scenario of the present method to show how to change/update the connected device configuration.

The FIG. 4 shows a scenario to update the security and connection credentials of a connected device (300) directly from a smart phone application (301), which implements the method (1000) of the present invention. The smartphone application (301) provides a configuration panel, wherein the user is able to update the network credentials (302), device credentials (security credentials) (303) and the cloud service credentials (304) to all devices connected to the same network (305) or select them individually (306). The request to change is done by the cloud service (307) and replicated to the device (300) via internet connection from anywhere.

Figure 5:
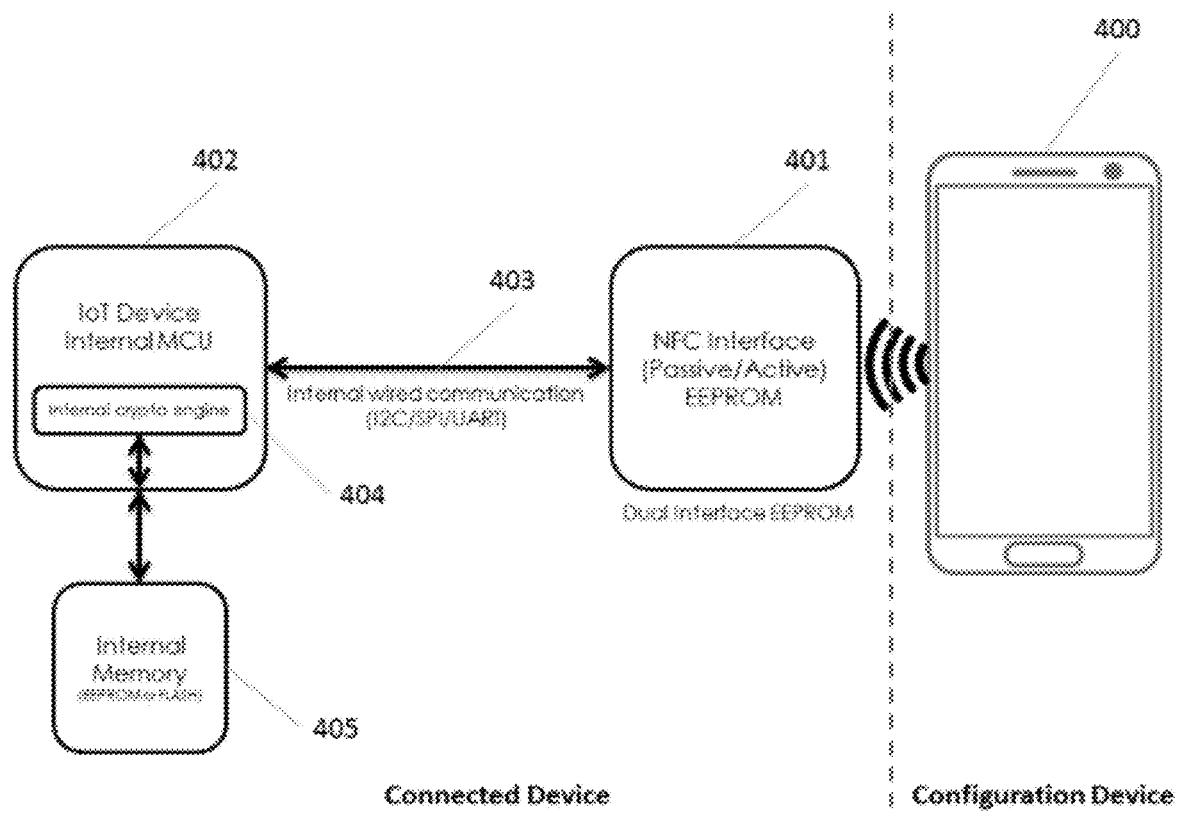
FIG. 5 is a description about the internal EEPROM with dual interface and shows how it is connected internally to the device microcontroller unit.

FIG. 5 shows the NFC writing process when a smartphone (400) is ready to send the configuration to the device using NFC. The mobile device (400) sends over NFC technology the data package with the configuration to the internal EEPROM (401) that will store the information on a protected area to avoid readings over the NFC. This information will be kept in the EEPROM until the first device boot, when the internal processor (402) will read the EEPROM using another communication channel (403), non RF/NFC, then this information can be encrypted using an internal cryptographic engine (404) to save it to the device internal memory (405). After information is transferred from the EEPROM/NFC memory to the internal device memory, it can be erased from the EEPROM (401). Although the cryptographic engine (404) is optional, according to the preferred embodiment of the present invention, it can be used to avoid reverse engineering on the hardware to retrieve the sensitive content by reading the memory.

According to the preferred embodiment of the present invention, to prevent from configuring the device before the buyer's acquisition, an aluminized sticker may be placed at front of the NFC antenna to block any attempt from outside the box, in order to cover the antenna area. This solution acts as a shield, blocking any electromagnetic field from the configuration device, avoiding the current generation on the antenna loop. Before configuration, user must remove such aluminized sticker.

Although the present invention has been described in connection with certain preferred embodiment, it should be understood that it is not intended to limit the invention to that particular embodiment. Rather, it is intended to cover all alternatives, modifications and equivalents possible within the spirit and scope of the invention as defined by the appended claims.

The invention claimed is:

1. A method for verifying authenticity and configuring credentials for a network and cryptographic keys for an internet of things (IoT) device using near field communication (NFC), the method comprising:
receiving a login from a user on an NFC device;
authenticating the login of the user, retrieving a security key for the user and default credentials for the network;
continuously attempting to establish a connection with the network;
determining when the user taps the IoT device using an NFC connection of the NFC device, and reading unique identification information stored in an NFC EEPROM of the IoT device with the NFC connection to determine an authenticity of the IoT device; and
when the IoT device is determined to be authentic, writing data into the NFC EEPROM of the IoT device to be used to configure the IoT device, transferring the written data to an internal memory of the IoT device, erasing the written data from the NFC EEPROM of the IoT device, and sending an activation command to enable a radio transceiver of the IoT device, to make the IoT device available to the network.

2. The method of claim 1, wherein when the IoT device is determined not to be authentic, interrupting the method operations.

3. The method of claim 1, wherein the data written into the NFC EEPROM of the IoT device includes the security key for the user and the default network credentials.

4. The method of claim 1, further comprising determining whether the user is a new user, and when the user is determined to be a new user, creating a new account, receiving profile information from the user, selecting a default network access, and creating a security key for the new user.

5. The method of claim 1, wherein the radio transceiver of the IoT device is enabled and available to the network only after a full configuration of the IoT device by the activation command.

6. The method of claim 1, wherein the activation command includes a flag written to the NFC EEPROM to activate the radio transceiver of the IoT device.

7. The method of claim 1, the mobile device including a mobile application with a graphical user interface which provides a login screen, and a configuration panel for the user to select settings to be sent to the IoT device.

8. The method of claim 1, wherein the NFC device is a mobile device.

9. The method of claim 1, wherein the NFC device is a network router.

10. The method of claim 1, wherein, when the IoT device is properly configured and the IoT device is powered on, an internal microcontroller of the IoT device is configured to read data in an exchange area in the NFC EEPROM, transfer the data to another memory of the IoT device, and erase the exchange memory area in the NFC EEPROM.

11. A non-transitory computer-readable recording medium storing a program configured to be executed by at least one processor to implement a method including:
- receiving a login from a user on a near field communication (NFC) device;
- authenticating the login of the user, retrieving a security key for the user and default credentials for a network;
- continuously attempting to establish a connection with the network;
- determining when the user taps an internet of things (IoT) device using an NFC connection of the NFC device, and reading unique identification information stored in an NFC EEPROM of the IoT device with the NFC connection to determine an authenticity of the IoT device; and
- when the IoT device is determined to be authentic, writing data into the NFC EEPROM of the IoT device to be used to configure the IoT device, transferring the written data to an internal memory of the IoT device, erasing the written data from the NFC EEPROM of the IoT device, and sending an activation command to enable a radio transceiver of the IoT device, to make the IoT device available to the network.

12. An apparatus comprising:
- at least one memory configured to store instructions; and
- at least one processor configured to execute the stored instructions to implement a method comprising:
  - receiving a login from a user on a near field communication (NFC) device;
  - authenticating the login of the user, retrieving a security key for the user and default credentials for a network;
  - continuously attempting to establish a connection with the network;
  - determining when the user taps an internet of things (IoT) device using an NFC connection of the NFC device, and reading unique identification information stored in an NFC EEPROM of the IoT device with the NFC connection to determine an authenticity of the IoT device; and
  - when the IoT device is determined to be authentic, writing data into the NFC EEPROM of the IoT device to be used to configure the IoT device, transferring the written data to an internal memory of the IoT device, erasing the written data from the NFC EEPROM of the IoT device, and sending an activation command to enable a radio transceiver of the IoT device, to make the IoT device available to the network.

* * * * *